Oct. 8, 1929.  S. E. POSEY  1,731,174
ASPARAGUS CUTTER
Filed June 14, 1928
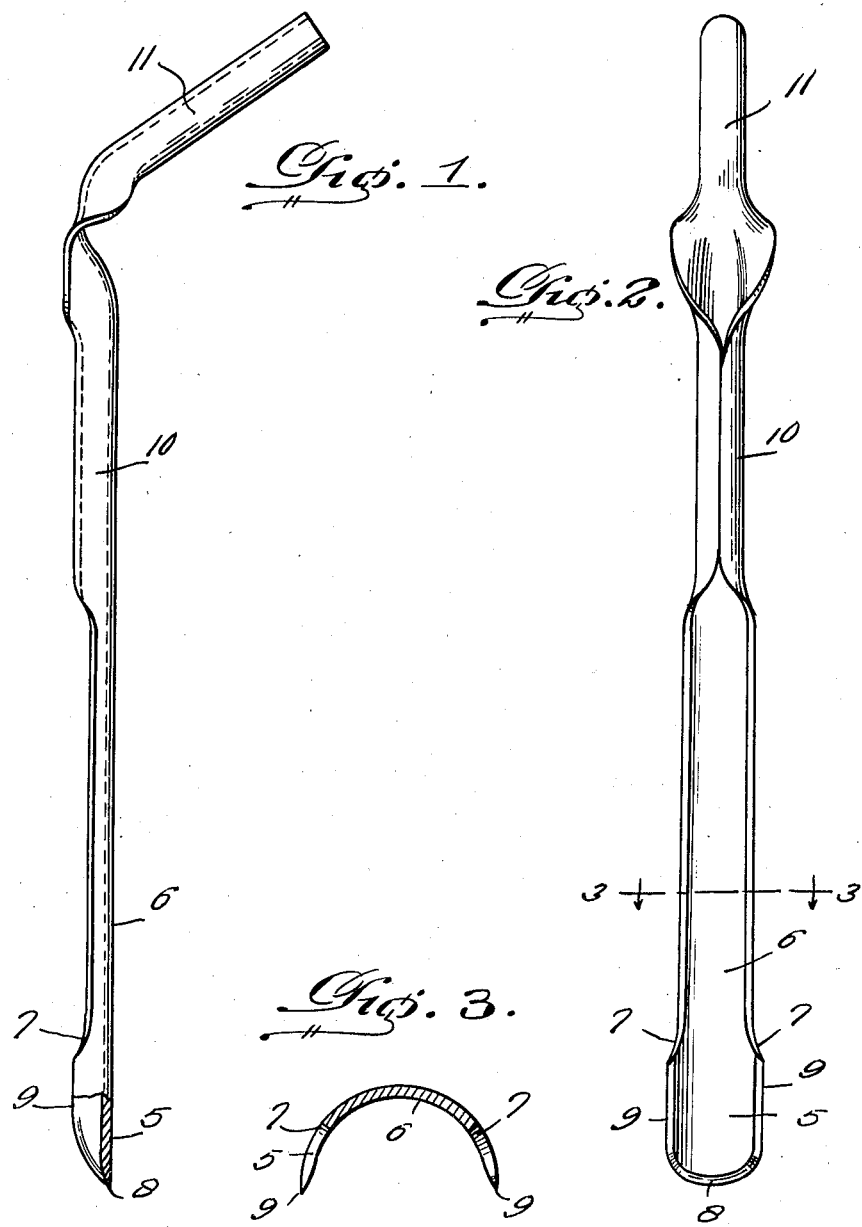
Inventor
Samuel E. Posey,
By J. Stanley Burch
Attorney Patented Oct. 8, 1929

1,731,174

UNITED STATES PATENT OFFICE

SAMUEL E. POSEY, OF TRENTON, SOUTH CAROLINA

ASPARAGUS CUTTER

Application filed June 14, 1928. Serial No. 285,429.

This invention relates to improvements in knives for cutting asparagus from the hills, the primary object of the invention being to provide a device of this character which is extremely simple and inexpensive in construction, and by means of which the individual shoots or stalks may be readily severed from the crown or root without in any manner damaging other shoots growing from the crown or breaking the tip of the cut shoot.

The invention consists in the novel form of cutter hereinafter more fully described, shown in the accompanying drawing and claimed.

In the drawing:

Figure 1 is a side elevational view, partly broken away and in section, of an asparagus cutter embodying the present invention.

Figure 2 is a front elevational view thereof; and

Figure 3 is an enlarged transverse section on line 3—3 of Figure 2.

Referring more in detail to the drawing, the present asparagus cutter embodies a transversely curved blade 5 integral with one end of and merging at its upper end with the lower end of an elongated narrower similarly curved shank 6, as at 7. The blade 5 is provided with a lower downwardly convexed cutting edge 8 and lateral cutting edges 9 to readily penetrate the ground in surrounding relation to the shoot to be cut, and due to the narrower form of the curved shank 6, the dirt will readily pass out of the upper end of the blade 5 without danger of adhering to and clogging in the latter. The concaved form of the shank 6 permits the blade 5 to be forced into the ground close to the base of the shoot without danger of damaging the upper portion or tip of the shoot to be cut, said shank 6 being of sufficient length and width as to accommodate the upper portion of the shoot without engaging the latter. This is true even though the cutter be revolved axially, as the blade 5 and shank 6 are straight and coaxial as will be clearly seen in Figures 1 and 2.

In the embodiment of the invention illustrated, the shank 6 is provided at its upper end with an integral split tubular portion which strengthens the cutter as a whole, said portion being indicated at 10. The portion 10 may have an integral rearwardly directed tubular extension 11 at its upper end to form a handle or hand grip disposed at such an angle to the axis of the blade 5 and shank 6 as to provide for efficient leverage to enable the cutter to be readily tilted backwardly and forced ahead in the shoot cutting operation. However, it is obvious that the split tubular portion 10, which is coextensive with the shank 6, may be utilized as a socket, and that the end of an angular wooden handle may be secured in this socket in lieu of the provision of the integral handle 11.

In use, the instrument is forced into the ground while the blade and shank are vertical or substantially parallel with the shoot to be cut, and after inserting the knife to a sufficient depth, it is laterally tilted backwardly or to the right of Figure 1 and forced ahead, so that the blade 5 will pass through the stalk or shoot. The knife is then lifted to gather the cut stalks or shoot. As the stalk or shoot projecting above the ground is the only one to be cut, it is obvious that as the tool is passed down with its concave side toward the shoot, there will be no danger of its coming in contact with the crown or with the other stalks growing therefrom.

In actual practice, it has been found that the present cutter may be easily used to expeditiously cut asparagus with a minimum damage to the crop.

Minor changes may be made without departing from the spirit and scope of the invention as claimed.

What I claim as new is:

1. An asparagus cutter comprising a transversely curved blade, an elongated transversely curved shank narrower than and coaxial with the blade, said shank being integral with and merging at its lower end with the upper end of the blade, a rearwardly directed handle rigidly connected to the upper end of said shank, and a split tubular member integral with the upper end of the shank and coaxial with the latter, said handle extending laterally from the upper end of said tubular member.

2. An asparagus cutter comprising a transversely curved blade, an elongated transversely curved shank narrower than and coaxial with the blade, said shank being integral with and merging at its lower end with the upper end of the blade, a rearwardly directed handle rigidly connected to the upper end of said shank, and a split tubular member integral with the upper end of the shank and coaxial with the latter, said handle extending laterally from the upper end of said tubular member and comprising a tubular integral extension on the upper end of said tubular member.

In testimony whereof I affix my signature.

SAMUEL E. POSEY.